3,288,643
PROCESS FOR MAKING CHARGED CADMIUM ELECTRODES
Robert E. Stark, Avon Lake, Ohio, assignor to Union Carbide Corporation, a corporation of New York
No Drawing. Filed Jan. 6, 1964, Ser. No. 336,022
7 Claims. (Cl. 136—24)

This invention relates to high surface-area electrodes, and more particularly to electrodes of this type carried on a grid-like structure and to a process for making such electrodes.

Negative electrodes of the type herein described find general application in the field of storage devices for electrical energy. Such devices include primary and secondary batteries, capacitors and the like.

In the past negative electrodes for use in batteries employed any one of several possible structures and related methods of manufacture. For example, electrodes have been made by pressing active material into a metallic grid. The active material may be faced with a metallic retainer screen or mat. Another form of electrode employed pellets or cakes of active material which are tightly enclosed within a perforated metal tube or screen. This type of electrode does not contain an inner grid. A third type of electrode comprises a sintered metal plaque which is impregnated with an active material.

The term "active material" as used herein is taken to include the electrochemically active metal or metal oxide together with any conductive particles or binders as distinguished from the supporting grid, screen or mat.

In general, all of these types of electrodes have required formation cycling and a final charge to insure good electrode structure and full capacity.

The formation process consists of immersing the electrode in an excess of electrolyte and alternately charging the cell by means of an external current, and then discharging the charged electrode. This charge-discharge cycle is repeated several times until the proper operating characteristics are obtained. After the formation process has provided the desired state of charge, the electrode is placed in a battery container and the final cell is assembled. Inasmuch as the formation is carried out in an open container to allow for the escape of evolved gases, the electrolyte absorbs carbon dioxide from the air. This necessitates the frequent renewal of electrolyte to prevent the carbon dioxide content from reaching undesirable levels.

It is a general object of this invention to provide a process for the maufacture of charged negative electrodes.

It is another object to provide an inexpensive process for manufacturing high rate negative electrodes.

A further object is to provide a negative electrode having improved physical properties in that the active material is tenaciously bonded to the grid or screen.

A more specific object of the invention is to provide a process for the manufacture of high surface area cadmium electrodes for use in alkaline batteries.

Broadly, the process for making the charged negative electrodes in accordance with the invention comprises forming a substantially uniformly blended powdery admixture of an active metal-containing compound and a metal capable of reducing the active metal-containing compound in the presence of an electrolyte solution; compressing the admixture into a carrier grid; and immersing the carrier containing the compressed admixture into a suitable bath of the electrolyte solution for a period of time sufficient to effect substantial reduction of the active metal compound to provide high surface active metal.

The term "reduction" is used in a broad sense and represents a gain in electrons by a species, and may in fact be either a chemical or an electrochemical reaction.

In one specific embodiment of the invention, a high surface area negative electrode for use in an alkaline battery may be made by forming a uniform admixture of a reducible cadmium containing compound and a metal capable of reducing the cadmium compound to cadmium metal and then compressing the admixture into a conducting carrier grid. The grid bearing the compressed mixture is then passed through an alkaline bath for the purpose of effecting the reduction of the cadmium compound.

Cadmium compounds which are suitable for use in the present invention include cadmium oxide, cadmium hydroxide, cadmium acetate, cadmium carbonate, cadmium chloride, cadmium chlorate, cadmium sulfate, cadmium nitrate and the like. Preferred compounds are the oxide, hydroxide and acetates of cadmium.

The reduction of the cadmium compound can be accomplished by means of a finely-divided metal reducing agent. The metals which may be used to reduce the cadmium ions are those metals which are placed above cadmium in the electromotive series, and thus will displace cadmium from a cadmium salt solution. The electromotive series is a list of metals arranged in decreasing order of their tendencies to pass into ionic form by losing electrons. Suitable metals include zinc, aluminum, and the like. Alloys of these metals are also suitable for use in the invention. Such metals and alloys may conveniently be referred to as cadmium replacing metals.

The reaction between the cadmium compound and the cadmium replacing metal is carried out in an aqueous solution, preferably an alkaline solution, e.g., potassium hydroxide and/or sodium hydroxide. As a matter of convenience, the reaction may be carried out in a continuous or batch wise manner. The carrier bearing the compressed admixture, e.g., aluminum and cadmium oxide, may be passed continuously through a bath of alkali ranging in concentration from about 0.001 to about 14.5 normal. The term "normal" as used herein refers to the concentration of alkali in the soultion expressed in gram-equivalents per liter of solution. It has been found that extremely high or low concentrations tend to slow down the reaction. Consequently, a suitable range is from about 10 to about 13 normal.

A preferred procedure is to employ a two-step batch process in which the electrode strip bearing the suitable materials is immersed in a dilute solution of alkali, e.g., from about 0.001 to about 0.1 normal. Then the electrode strip is immersed in a more concentrated solution, e.g., from 0.1 normal to about 14.5 normal and preferably from about 10 to about 13 normal. The initial immersion in dilute alkali moderates the initial reaction and avoids violent evolution of gas and spalling of active material. In the second stage the reaction goes to completion in a reasonable time but in a less violent manner since much of the aluminum has already reacted.

The alkali solution is preferably maintained at a temperature of about 20° C. The upper temperature limit will depend on the boiling point of the alkali solution which is in turn dependent on the concentration of alkali in the solution. A preferred temperature range is from about 20° C. to about 100° C.

The influence of temperature upon the reaction provides an additional convenient technique for the preparation of the herein described electrodes which requires only one alkali solution. The grid containing the compressed formulation can be immersed in a concentrated solution of alkali which is at a low temperature. Due to the heat of reaction the solution rises to room temperature or higher. To complete the reaction the solution can be heated to any necessary temperature.

The initial low temperature provides for a slow and less violent reaction similar to that obtained through the use of an initial solution of low concentration.

The powdery admixture is compressed or packed into the carrier grid by means of tampers or compression rolls to a predetermined density. In general a density of about 2.8 grams per cubic centimeter provides an electrode suitable for use in the present invention. Increased cohesion can be obtained by the incorporation of small amounts of a binder such as polyvinyl formal in the mix. The amount of polyvinyl formal can range from zero to about 10 weight percent of the mixture. After pressing the electrode is heated at about 130° C. for about one half hour to bond the polyvinylformal.

Since the density of the compressed powder is dependent in part on the formulation, i.e., on the ratio of the various constituents, it is helpful to express this factor in terms which are applicable to all formulations. Inasmuch as the compressed powder is desirably uniformly interspersed with many tiny voids it is convenient to describe the physical structure in terms of "percent void volume." The percent void volume is defined as 100 minus the percent packing. The percent packing is defined as 100 multiplied by the ratio of the measured density of the compressed powder to the theoretical maximum density of the same formulation. Percent packing is thus equivalent to percent of theoretical density. Broadly, the percent of theoretical density is desirably maintained between 40 and 80 percent for the unreacted electrode and preferably between 50 and 56 percent.

The percent void volume of the final electrode, that is, after reaction, is preferably between 40 and 80 percent and most desirably is about 60 percent void volume. The void volume of the final electrode is controlled by the percent packing factor. The void volume of the final electrode is influenced by the temperature and concentration of the alkaline bath. However, the most effective method of controlling the void volume of the final electrode is through control of the percent packing of the unreacted electrode.

The carrier grid is preferably constructed of a flexible, conductive metal which is compatible with the battery system and may be in the form of a wire mesh screen, a punched metal strip or an expanded metal strip. The preferred carrier is an expanded nickel or nickel-plated strip.

The carrier grid bearing the mixture, e.g., cadmium oxide and aluminum is passed through a tank of alkali, e.g., 6 normal potassium hydroxide by any convenient means, such as, a system of rollers. The rate at which the electrode is passed through the alkali will depend on the time required to effect the desired degree of reaction. The rate of reaction is dependent on the temperature and the concentration of the alkali solution.

In general, the total time during which each unit section of electrode surface is immersed in the reaction solution may range over a considerable period of time depending on such factors as concentration and temperature of the reaction bath.

For example, in a process employing two steps, i.e., initial immersion in weak alkali and a subsequent immersion in more concentrated alkali, the initial immersion was for 16 hours in 0.1 normal potassium hydroxide and the second immersion was for 4 hours in 6 normal potassium hydroxide. As a general rule, the electrode strip is immersed in the more concentrated alkali for about one half hour after the last bubbles of hydrogen gas are observed.

After passing through the alkali solution the electrode is washed free of residual alkali. This may conveniently be accomplished by passing the electrode through a tank of water agitated by an ultra sonic transducer. Alternatively, after an initial wash the residual alkali may be neutralized by a dilute, e.g., 5 percent, boric acid solution. In connection with the washing step it is important that substantially all the potassium aluminate, a by product of the reduction reaction, or residual aluminum be removed before the pH of the solution which is contained in the electrode structure is reduced.

The electrode is then dried at a temperature of about 110 to 135° C. Drying is preferably carried out in an inert atmosphere, e.g., nitrogen gas vacuum to prevent the oxidation of the cadmium metal.

A critical period in the practice of the invention during the first several minutes of immersion in the alkali solution. Due to the rate of reaction, there is a copious evolution of hydrogen gas which may cause the loss of active material from the electrode. In the batch process, this may be minimized by rolling the electrode strip into a tight compact. However, the compact must not be so tight as to prevent the alkali from permeating the entire electrode. In a continuous manufacturing process, the electrode can be held on both sides by a perforated web of an inert material, e.g., nickel, at a slight pressure, for example 2–3 pounds per square inch. The perforations should be sufficient to allow adequate exposure of the electrode surface to the alkali.

While the present invention has been particularly described in terms relating to cadmium electrodes, it is clear that a similar process can be employed for the production of a wide variety of high surface area active metal electrodes, for example, iron electrodes can be prepared from iron oxide ($Fe_2O_3$).

The reducible material which is employed must be a good cathode material, that is, one which has a tendency to be easily reduced such as zinc oxide, lead oxide, iron oxide and the like.

The ratio of combined cadmium to cadmium replacing metal is not narrowly critical and can be conveniently adjusted within broad limits to provide a properly balanced electrode. Since the reduction process is not 100 percent efficient, an excess of cadmium replacing metal, e.g., aluminum, over and above the stoichiometric amount is necessary to reduce all the cadmium ions to cadmium metal. In this connection, an excess of at least 20 percent has been found sufficient to reduce all the cadmium ions present.

In the manufacture of cadmium electrodes, it is often desired to provide an amount of overcharge protection by the presence of uncharged material in the charged electrode. This can be conveniently accomplished by providing less cadmium replacing metal than is needed to reduce all cadmium ions in the crystal latice of the hydroxide or oxide. For example, satisfactory electrodes may be prepared by providing a mixture of from about 80 to 90 weight percent cadmium oxide and from about 10 to 20 weight percent aluminum. Thus, conversion of cadmium oxide to cadmium metal can be held to a predetermined ratio for adequate overcharge protection in a specific cell.

Similarly, negative electrodes having small amounts of charged material in them can be prepared by reducing only a portion of the cadmium compound. For example, an electrode having about 5 percent charged material can be made by preparing a formulation comprising cadmium oxide and only about 5 percent of the stoichiometric amount of aluminum necessary to reduce all the cadmium oxide.

Nickel powder, in amounts up to about 40 percent by weight, may be incorporated in the formulation to provide strength and crush resistance to the finished electrode. Crushing of the electrode material results in a decrease in the surface area of the active material and consequent loss of efficiency.

It will be appreciated that high surface area cadmium electrodes find application in many types of electrical devices. Such electrodes are particularly useful in batteries of the silver-cadmium and nickel-cadmium types.

What is claimed is:
1. A process for the manufacture of charged cadmium electrodes which comprises forming a homogeneous mixture comprising from about 80 to 90 weight percent of a cadmium compound selected from the group consisting of cadmium oxide, cadmium hydroxide, cadmium acetate, cadmium carbonate, cadmium chloride, cadmium chlorate, cadmium sulfate and cadmium nitrate, and from about 10 to 20 weight percent of a metal selected from the group consisting of aluminum and zinc, both based on the total weight of the mixture, compressing said mixture into a conductive carrier grid to about 40 to 80 percent of the theoretical density and immersing the grid containing the compressed mixture in an alkaline solution selected from the group consisting of potassium hydroxide and sodium hydroxide having a concentration of at least 6 normal at a temperature of about 100° C. for at least 5 minutes, removing residual hydroxide and drying the thus formed electrode in an inert atmosphere.

2. The process of claim 1 wherein the conductive carrier grid containing the compressed mixture is immersed in a dilute alkaline solution having a concentration of from about 0.001 to about 0.1 normal following the compression step and prior to immersing in the alkaline solution having a concentration of at least 6 normal.

3. The process of claim 2 wherein the immersion of the conductive carrier grid containing the compressed mixture in the dilute alkaline solution is carried out for about 16 hours and the immersion in the more concentrated alkaline solution is carried out for about 4 hours.

4. The process of claim 1 wherein nickel powder is added to said homogeneous mixture.

5. The process of claim 1 wherein the metal component of said homogeneous mixture is aluminum.

6. The process of claim 1 wherein the metal component of said homogeneous mixture is zinc.

7. The process of claim 1 wherein the conductive carrier grid is composed of nickel.

References Cited by the Examiner

UNITED STATES PATENTS

| | | | |
|---|---|---|---|
| 2,870,234 | 1/1959 | Moulton | 136—24 |
| 2,934,580 | 4/1960 | Neumann | 136—6 |
| 3,048,644 | 8/1962 | Euler | 136—83 |
| 3,180,761 | 4/1965 | Horn et al. | 136—51 |
| 3,228,795 | 1/1966 | Ackermann | 136—78 X |

WINSTON A. DOUGLAS, *Primary Examiner.*

MURRAY TILLMAN, *Examiner.*

B. J. OHLENDORF, *Assistant Examiner.*